United States Patent
Kalnitsky et al.

(10) Patent No.: US 8,549,922 B2
(45) Date of Patent: Oct. 8, 2013

(54) MOTION DETECTION USING CAPACITOR HAVING DIFFERENT WORK FUNCTION MATERIALS

(75) Inventors: Alexander Kalnitsky, San Francisco, CA (US); Fu-Lung Hsueh, Cranbury, NJ (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 546 days.

(21) Appl. No.: 12/720,813

(22) Filed: Mar. 10, 2010

(65) Prior Publication Data

US 2011/0219876 A1 Sep. 15, 2011

(51) Int. Cl.
*G01P 15/125* (2006.01)

(52) U.S. Cl.
USPC ..................................... 73/514.32; 324/176

(58) Field of Classification Search
USPC ........ 73/514.32; 324/661, 662, 176; 361/278, 361/280
See application file for complete search history.

(56) References Cited

U.S. PATENT DOCUMENTS

| | | | |
|---|---|---|---|
| 4,686,847 A * | 8/1987 | Besocke | 73/24.01 |
| 6,000,287 A | 12/1999 | Menzel | |
| 7,107,158 B2 * | 9/2006 | Steele et al. | 702/35 |
| 7,412,888 B2 | 8/2008 | Chu et al. | |
| 7,525,304 B1 * | 4/2009 | Feng et al. | 324/762.01 |
| 7,650,253 B2 | 1/2010 | Weed et al. | |
| 2004/0035206 A1 * | 2/2004 | Ward et al. | 73/514.32 |

OTHER PUBLICATIONS

Szadkowski, A.J., et al., "Implications of the change in work function of chromium by the presence of hydrogen on the properties of electrical contact between chromium and hydrogenated amorphous silicon", J. Appl. Phys., Jan. 1982, 53(1):557-558.

* cited by examiner

*Primary Examiner* — John Chapman, Jr.
(74) *Attorney, Agent, or Firm* — Duane Morris LLP

(57) ABSTRACT

An apparatus for detecting mechanical displacement in a micro-electromechanical system includes a capacitor having first and second plates spaced from one another, the first and second plates having different work functions and being electrically connected with each other. The capacitor plates are movable with respect to one another such that a spacing between the plates changes in response to a force. A current through the capacitor represents a rate of change in the spacing between the plates at a given time.

22 Claims, 9 Drawing Sheets

MOTION DETECTION USING CAPACITOR HAVING DIFFERENT WORK FUNCTION MATERIALS

FIELD OF THE INVENTION

The present invention relates to methods and apparatuses for detecting motion.

BACKGROUND OF THE INVENTION

In modern video game controllers, for example, the conventional way to detect motion is by measuring capacitance. One such motion detector 10 based on capacitance measurements is shown in FIG. 1. The motion detector 10 includes two metal plates 12, 14 separated by a small distance D. One of the plates is fixed and the other is free to move relative to the other in the direction illustrated by the arrow in response to some force. Some form of spring, such as bellow or diaphragm 16, is disposed between the two metal plates 12, 14 to restore the plates to their static relationship after a force induced motion of the two plates relative to one another. If there is a motion, the distance between the two metal plates 12, 14 will change from D to D'. The slight difference between D' and D will result in a change in the capacitance between the two metal plates. By measuring the capacitance during the course of motion, the acceleration, the velocity and the distance of motion can be calculated. The motion sensors in Nintendo's Wii® game controller are based on this principle.

The capacitance of the capacitor 10 is $C = x \ast y \ast \in / D$, where x and y are the two dimensions of the metal plates 12, 14, $\in$ is the permittivity of the dielectric between the plates 12. 14, and D is the distance between plates. With these types of prior art motion detectors, the change in capacitance is very small and hard to measure in real time. An alternative motion sensor that is faster, cheaper, and/or more accurate is desired.

SUMMARY OF THE INVENTION

An apparatus for detecting mechanical displacement in a micro-electromechanical system includes a capacitor having first and second plates spaced from one another, the first and second plates having different work functions and being electrically connected with each other. The capacitor plates are movable with respect to one another such that a spacing between the plates changes in response to a force. A current through the capacitor represents a rate of change in the spacing between the plates at a given time.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
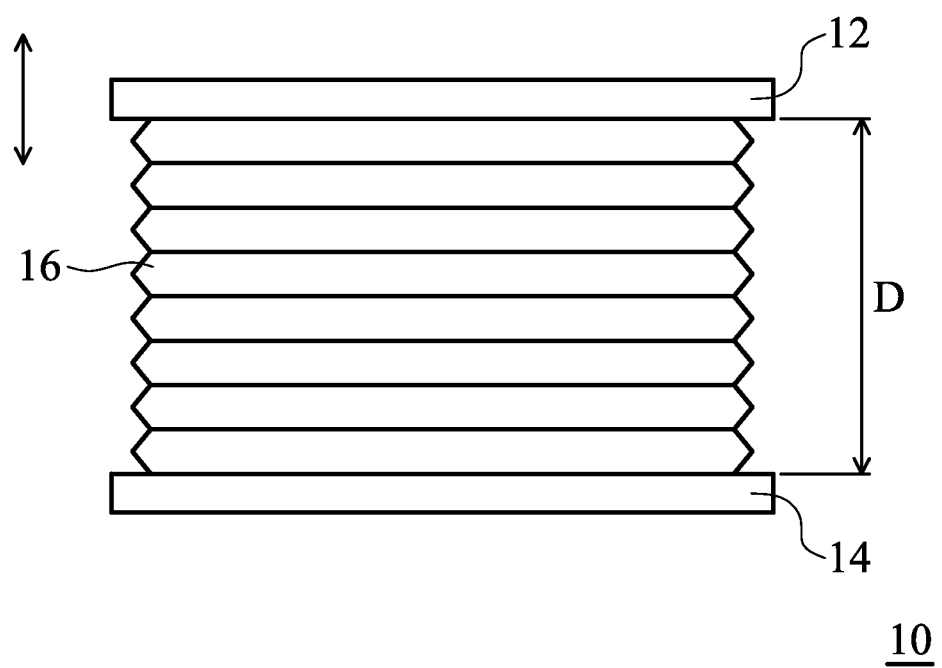
FIG. 1 illustrates a capacitor for use in a prior art motion sensor.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

A method and apparatus for detecting mechanical displacement in micro-electromechanical (MEMS) devices is provided. The displacement determination is based on the detection of current generated by modulating the distance between two plates of a capacitor where the capacitor plates are made of materials with dissimilar work functions. By "work function" it is meant the minimum amount of energy required to remove an electron from the surface of a conducting or semi-conducting material. If the plates are electrically connected to one another, the work function difference between the materials forming the two capacitor plates generates a built-in electrical field. The electric field across the capacitor is modulated with the distance between the plates. That is, at equilibrium there will be an electric field built-in between the plates and no current flowing in the system. If the distance between these two plates changes, the field will change and the current will flow. By measuring the magnitude of the current, the change in distance between the metal plates can be calculated. The current through the capacitor represents the rate of change in spacing between the capacitor plates, i.e., plate velocity. The acceleration can also be calculated for a MEMS motion sensor. The sensor disclosed herein can have far ranging applications, such as in video game controllers and joy sticks, accelerometers, gyroscopes, safety devices (such as air bag deployment) and others.

Figure 2A:
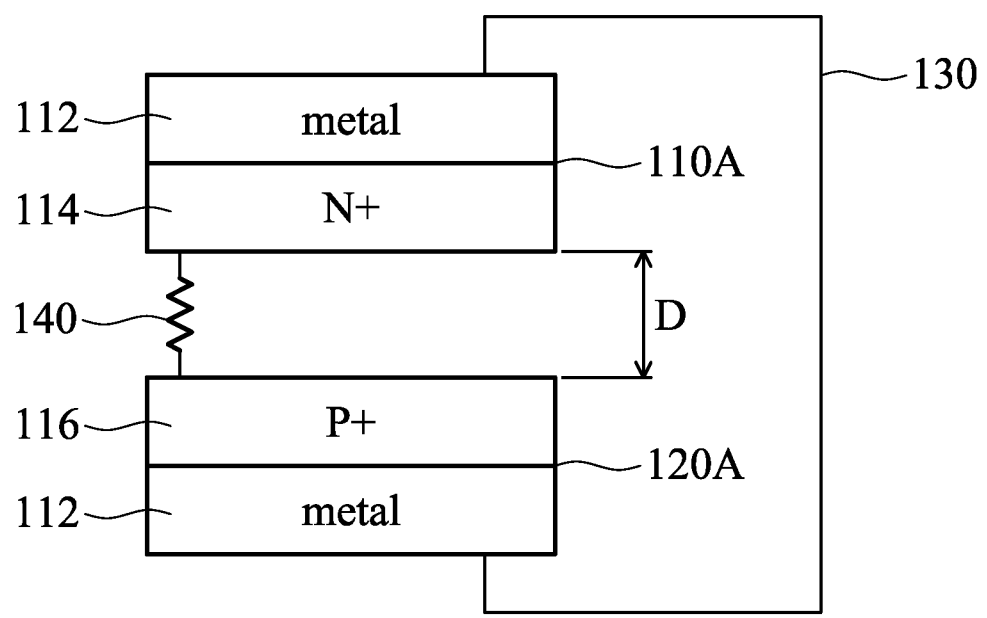
FIGS. 2(*a*) to 2(*d*) illustrate capacitors for use in a motion sensor according to embodiments of the present invention.

The capacitor plates can be formed between metals with dissimilar work functions, metal/semiconductor structures with dissimilar work functions, semiconductor materials with dissimilar work functions, between semiconductor materials with different dopants, or combinations of these materials or structures. FIGS. 2(*a*) to 2(*d*) illustrate various embodiments of capacitors having capacitor plates having different work functions. FIG. 2(*a*) illustrates a capacitor 100A including a first capacitor plate 110A and second capacitor plate 120A. The plates are spaced a distance D from one another. The dielectric between the capacitor plates 110A, 120A is assumed to be air or vacuum. Each capacitor plate 110A, 120A is formed from a metal layer 112, such as Al, W, Ti, Au or other metals suitable for integration in a specific MEMS process flow and a semiconductor layer formed thereon. The capacitor plate 110A includes layer 114 of an N+ doped semiconductor material (e.g., silicon) and the capacitor plate 120A includes layer 116 of a P+ doped semiconductor material (e.g., silicon). The capacitor plate's work function is determined by the work function of the material facing into the "gap" between the plates 110A, 120A (i.e., by the N+/P+ layers 114, 116). The metal layers 112 can be provided to provide a specific work function (if facing the gap between the plates) or to provide a low resistance connection as shown in FIG. 2(a).

The capacitor plates 110A, 120B are physically connected to one another via an elastic element shown as elastic element 140. If there is no external force, the capacitor plates stay at a static position. If there is relative movement between the plates, the elastic element 140 helps restore the plates to their static position. The elastic element 140 may be a spring, an elastic sheet, elastic diaphragm or the like. One of the electrode plates may be a stationary electrode plate (i.e., fixed) and the other electrode plate may be considered a movable electrode plate positioned parallel to the stationary plate and free to move in a direction orthogonal to the major surface of the plates.

The capacitor plates 110A, 120B are electrically connected to one another. This electrical connection is shown as connection 130 in the drawings of FIGS. 2(a) to 2(d). When two electrically connected materials with dissimilar work functions are brought in close proximity to each other, the Fermi levels of these materials line up due to the absence of electric current between the two materials. The work function difference between them creates a charged capacitor and the electric field between these features. The charge on the capacitor is equal to $Q=-\Delta\Phi*C/e$, where e is the electron charge sign, $\Delta\Phi$ is the work function difference (in eV) between the materials and C is the capacitance of the structure. The electric field between the features (e.g. uniform field in a parallel plate capacitor) is $E=-\Delta\Phi*/De$, where D is the distance between the plates at a given time.

If there is movement of the plates relative to one another, such that the spacing between the plates changes, an electrical current is generated. The magnitude of the current can be determined (for a parallel plate capacitor) as follows: $I=-\Delta\Phi*x*y*\in/e[1/D-1/D']/\Delta t=A*\Delta D/[\Delta t(D*D')]$, where A is the "structure" constant and is equal to the area of the plates (x*y) times $\in/e$; $\in$ is the dielectric constant (e.g., 1 for a vacuum); D-D' is $\Delta D$; and $\Delta t$ is the change in time. This expression shows that the detection current is proportional to the relative velocity of the two electrodes.

The relative movement in the capacitor plates will cause an AC/transient current. Assuming the distance between the two plates is not very large, the current will be proportional to the velocity of the plate ($\Delta D/\Delta t$). Continuously detecting velocity provides a change in velocity ($\Delta v$) over a given time period ($\Delta t$). The first derivative of velocity/time ($\Delta v/\Delta t$) is acceleration. As such, the capacitor can be used as a motion detector for an accelerometer.

It should be noted that it is not necessary to know the physical properties of the elastic element that attaches the first and second capacitor plates in order to determine velocity and acceleration, but knowing the physical properties of the elastic element can help provide information on the sensitivity of the motion detector since $\Delta D$ is dependent on the properties of the elastic element. In embodiments, the maximum value of $\Delta D$ may be between around 1 μm to a few microns.

Figure 2B:
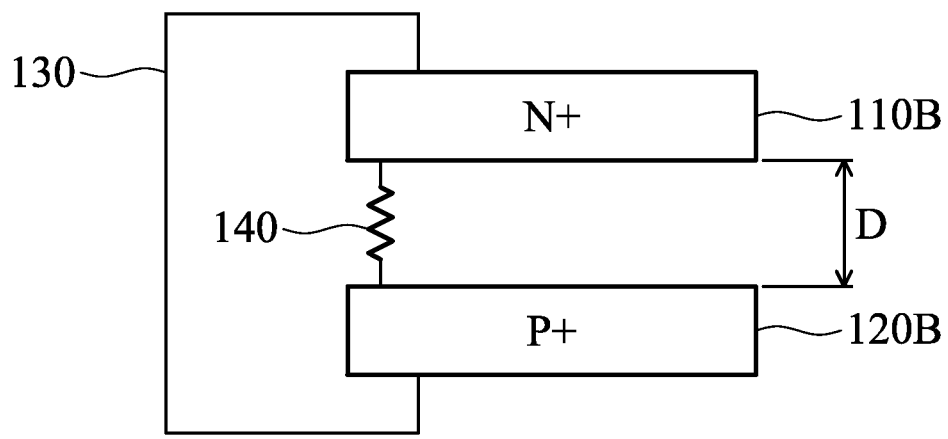

FIG. 2(b) illustrates an embodiment of a capacitor 100B where the two capacitor plates are semiconductor materials having different dopant kinds, e.g., N+ and P+. In the illustrated embodiment, the capacitor plate 110B is a semiconductor material doped with n-type dopants and the capacitor plate 120B is a semiconductor material doped with p-type dopants.

Figure 2C:
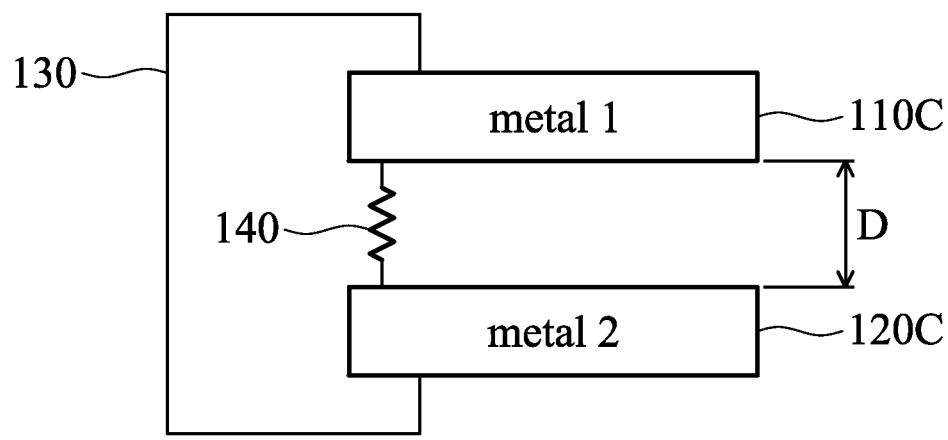

FIG. 2(c) illustrates an embodiment of a capacitor 100C where the two capacitor plates are formed from different metal materials having different work functions. Capacitor plate 110C is formed from a first metal and capacitor plate 120C is formed from a second metal.

Figure 2D:
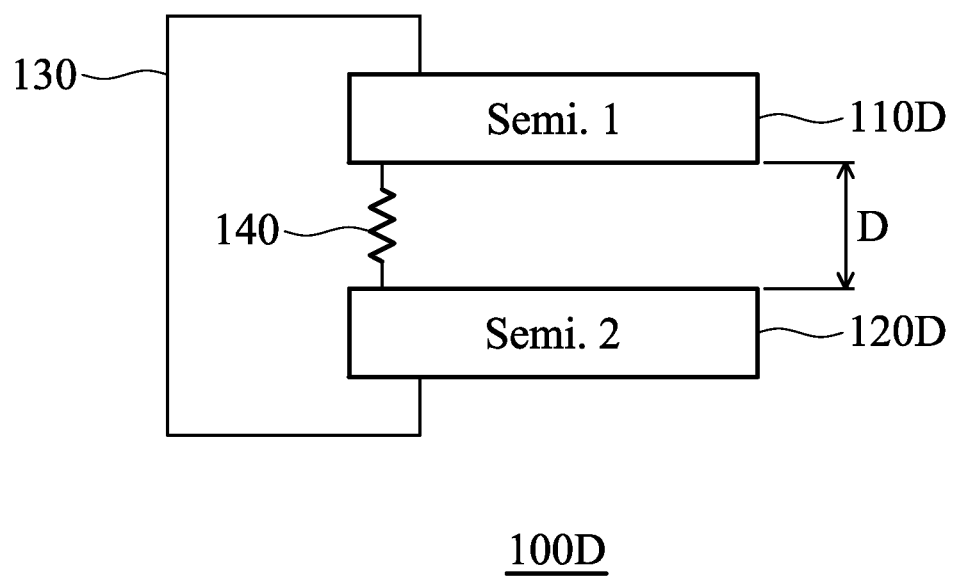

FIG. 2(d) illustrates an embodiment of a capacitor 100D wherein the two capacitor plates are formed from different semiconductor materials having different work functions. Capacitor plate 110C is formed from a first semiconductor material (e.g., n- or p-doped silicon) and capacitor plate 120C is formed from a second semiconductor material (e.g., n- or p-doped germanium). Different dopants, different doping concentrations, different semiconductor base materials or combinations thereof can be used to provide materials having different work functions. By way of example, the expected work function difference between the N+ and P+ Si is approximately 1.1 eV. Certain metals can produce work function differences greater than about 2 eV.

Figure 3:
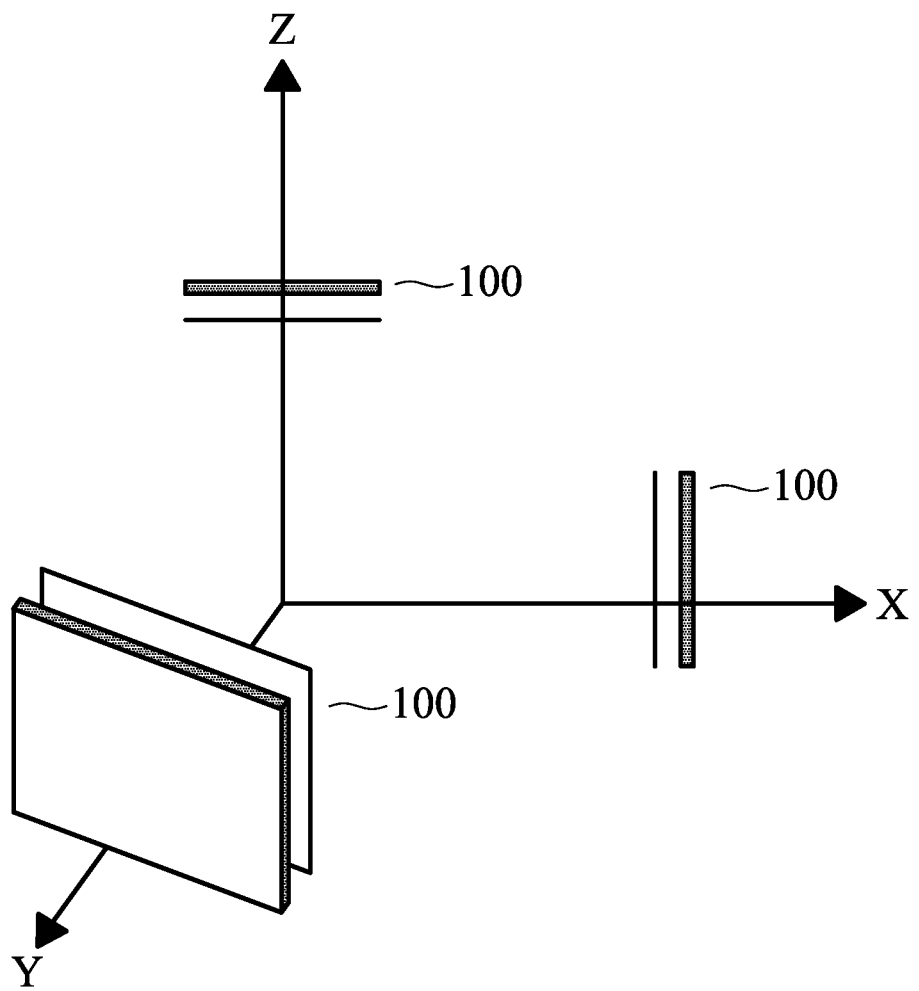
FIG. 3 illustrates capacitors oriented along three axes for motion detection in three dimensions.

FIG. 3 illustrates an embodiment of a motion detector having capacitor sensors aligned along three different axes, including a vertical axis, a lateral axis and a longitudinal axis. This orientation can be used to form a 3-dimensional accelerometer sensing acceleration in the direction of each of the three axes.

Figure 4:
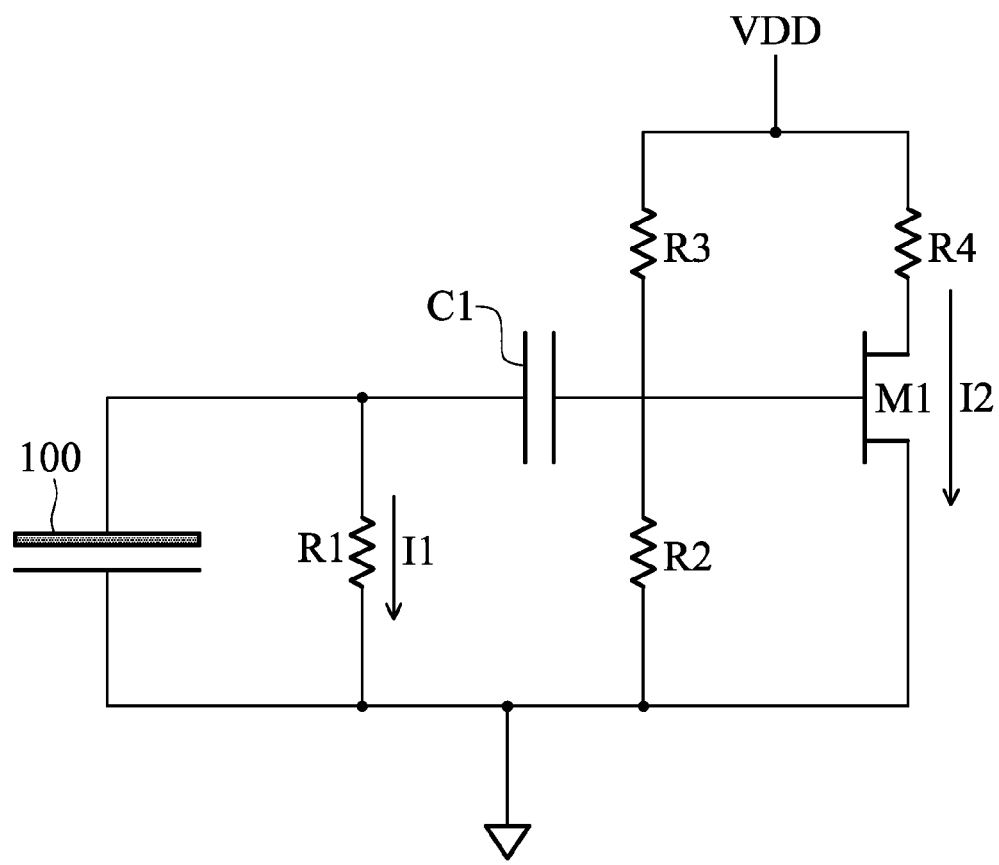
FIG. 4 illustrates an embodiment of a current sensor for capacitor.

FIG. 4 illustrates a capacitor 100 formed as discussed above, i.e., a capacitor with two capacitor plates of different work functions and movable with respect to one another in response to a force, connected to a current sensing circuit. More specifically, the capacitor 100 is connected in parallel with resistor R1 for generating a first current I1. This current I1 is then mirrored and amplified via a JFET amplification stage comprising a JFET M1, resistors R2, R3 and R4 and capacitor C1. Resistor R4 and the JFET M1 form an amplifier. Resistors R2, R4 bias the JFET into a desired state. Capacitor C decouples the DC bias on the gate of the JFET from the MEMS element. Resistor R1 provides a voltage drop due to the MEMS-generated current. This voltage drop is sensed by the amplifier.

Figure 5:
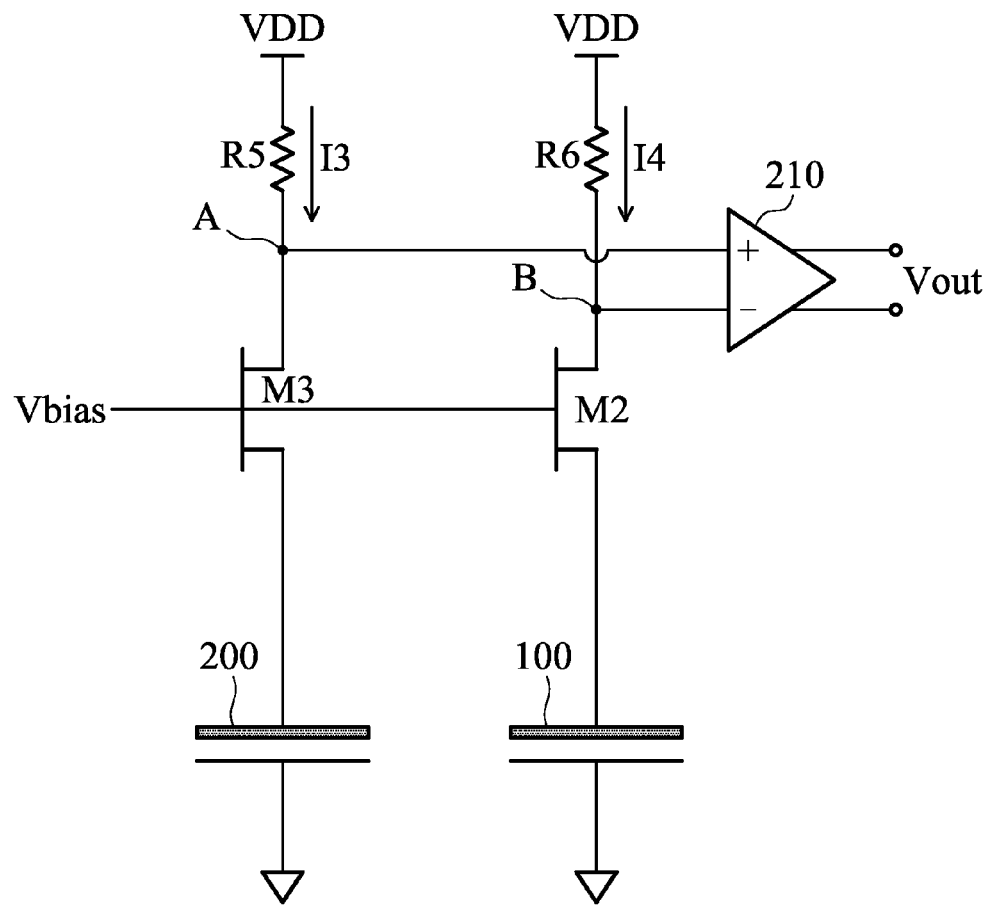
FIG. 5 illustrates an embodiment of a differential sensing circuit.
Figure 6:
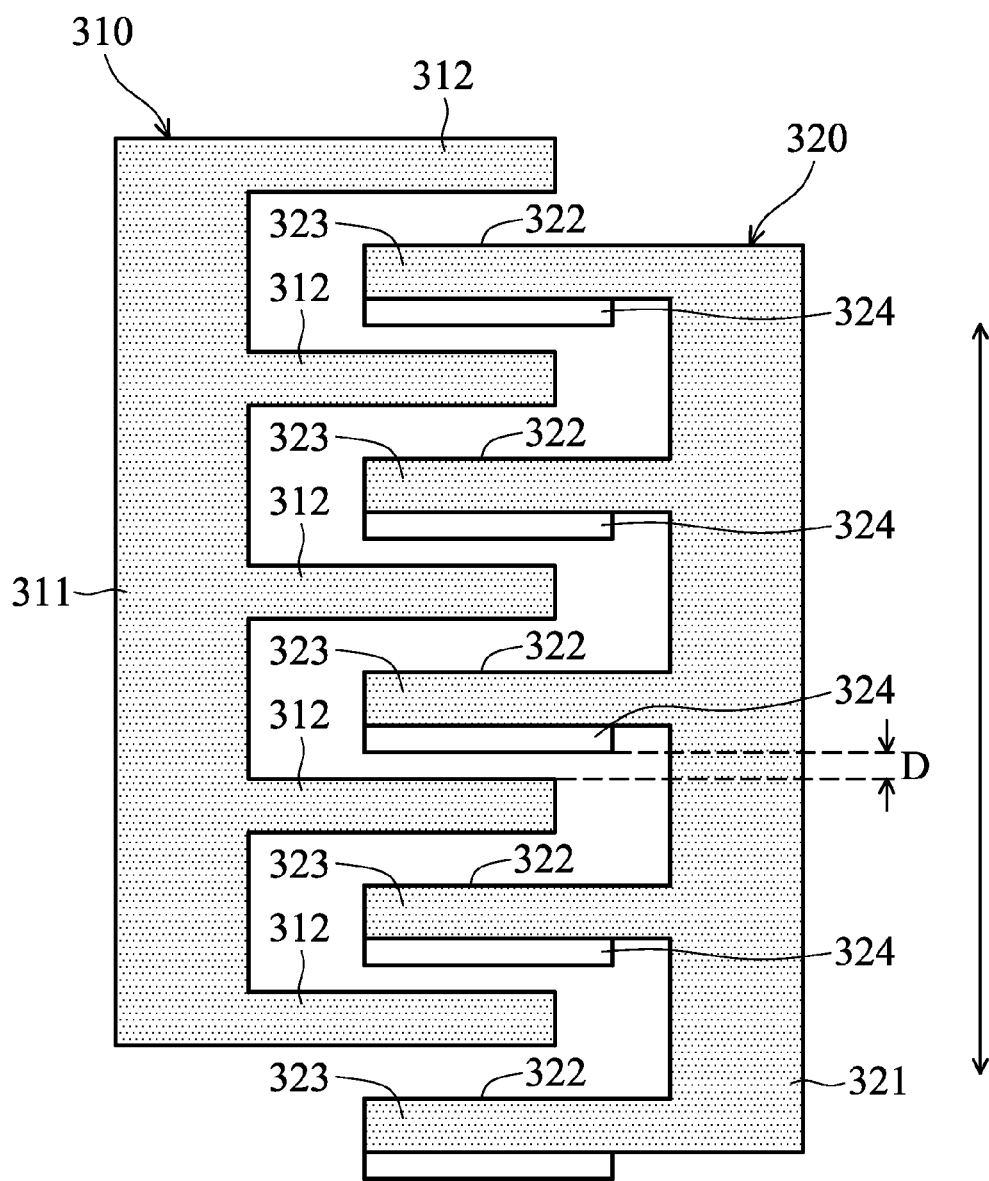
FIG. 6 illustrates a structure having interdigitated capacitors for sensing movement.

FIG. 5 illustrates an embodiment of a sensor with differential sensing. This embodiment employs two capacitors 100, 200. The first capacitor 100 is formed in the manner described above. That is, capacitor 100 has two capacitor plates of different work functions spaced apart from one another and movable relative to each other in response to a force. The second capacitor 200 is identical to capacitor 100 only the two capacitor plates are fixed relative to one another so as to provide a reference current. Each capacitor is connected to the source of an NMOS transistor M2 or M3, which are biased in the on state by voltage VBIAS. Resistors R6 and R5 are connected to the drains of the transistors M2 and M3, respectively. Reference current I3 is generated by the reference stage (i.e., R5, M3, capacitor 200) and transient current I4 is generated in the detection stage (i.e., R6, M2, capacitor 100). Voltage drops occur across resistors R5 and R6 representative of the currents I3 and I4, respectively. The resulting voltages at nodes A and B are compared and amplified by the differential amplifier FIG. 6 illustrates an embodiment of a motion sensor including a plurality of capacitors arranged in an interdigitated assembly 300. The interdigitated assembly includes first and second comb electrode sections 310, 320 that are movable relative to one another in the direction of the arrow illustrated next to the assembly 300. For example, the first section 310 can be fixed whereas the second section 320 is free to move relative to the first section 310, or vice versa. The first section 310 includes a plurality of capacitor plate arms 312 extending from a stem or trunk section 311. These capacitor plate arms 312 are formed from a material having a first work function. The second section 320 includes a plurality of capacitor plate arms 322 extending from a step or trunk section 321. Each capacitor plate arm 322 includes a first side 323 formed from a material having the same work function as the first work function of the capacitor plate arms 312 and a second side 324 formed from a material having a different (second) work function than the first work function. Each section 324 and the capacitor plate arm 312 that it faces forms a respective capacitor. So, the interdigitated structure includes a plurality of capacitors with each capacitor having a first plate with a first work function and a second plate with a second work function. As the two sections 310, 320 move relative to one another, the spacing (D) between the capacitor plate sections 324 and the capacitor plate arm 312 of each capacitor changes equally. A current is generated through each branch of the capacitor. Electrical contacts can be made to trunk section 311 and to trunk section 312 to sense the generated current. The sum of these currents can be detected and averaged across the total number of capacitors contributing to the detected current to provide a better indication of the actual displacement. This larger current and changes therein are easier to detect than the smaller current through a single capacitor, making for a more accurate detector. It should be noted that capacitors are also formed between arms 312 and sections 323 of arms 322. However, these capacitor plates have the same work function and thus produce zero current.

In FIG. 6, it should be understood that the one of the sections 310, 320 can be part of or connected to a fixed support member attached to a substrate. The other of the sections 310, 320 is part of or connected to a deflection member attached to the support member, such as by an elastic element as discussed above, so as to deflect relative to the support member. Any number of kinds of support members and deflection members can be provided for positioning the capacitor described herein relative to one another. These support members are known in the art of capacitive motion detection and are used to support and allow deflection relative to one another of the plates of capacitors 10 described above in the Background section.

As is conventional, the capacitor structures disclosed herein can be incorporated into a sense element chip. While not shown, a device incorporating the sense element chip may include an interface electronics chip, a substrate, a ceramic chip carrier, a cover enclosing these structures or other structures as will be familiar to those in the art of capacitive motion detection.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A micro-electromechanical motion sensor for sensing motion of a device to which the sensor is attached, the motion sensor comprising a capacitor having first and second capacitor plates spaced from one another, the first and second plates having different work functions and being electrically connected with each other, wherein the plates are movable with respect to one another such that a spacing between the plates changes in response to a force from motion of the device to which the sensor is attached, a current through the capacitor being representative of a rate of change in the spacing between the plates at a given time, the motion sensor further comprising a reference capacitor having third and fourth capacitor plates spaced from one another, the third and fourth capacitor plates having different work functions, wherein the third and fourth capacitor plates are fixed with respect to one another such that a spacing between the plates is maintained in response to the force to provide a reference current through the reference capacitor.

2. The micro-electromechanical motion sensor of claim 1, wherein the first and second capacitor plates comprise first and second metal materials having different work functions.

3. The micro-electromechanical motion sensor of claim 1, wherein the first and second capacitor plates comprise first and second semiconductor materials having different work functions.

4. The micro-electromechanical motion sensor of claim 3, wherein the first and second capacitor plates further comprise a conductive contact layer to which the first and second semiconductor materials are coupled.

5. The micro-electromechanical motion sensor of claim 1, wherein the apparatus includes a plurality of the capacitors oriented to detect motion along a plurality of different axes.

6. The micro-electromechanical motion sensor of claim 5, wherein the plurality of capacitors comprises three capacitors oriented to detect motion along a vertical axis, a lateral axis and a longitudinal axis.

7. The micro-electromechanical motion sensor of claim 1, wherein the apparatus includes a plurality of the capacitors arranged in an interdigitated assembly.

8. The micro-electromechanical motion sensor of claim 7, wherein the apparatus includes:
a first comb electrode having a plurality of first capacitor plate arms having a first work function, and
a second comb electrode having a plurality of second capacitor plate arms interdigitated with the plurality of first capacitor plate arms, each second capacitor plate arm having a material having the first work function on a first side thereof facing a first capacitor plate arm and a material having a second work function different from the first work function on a second side thereof facing a different first capacitor plate arm.

9. The micro-electromechanical motion sensor of claim 1, wherein the capacitors are connected in parallel with one another between two power supply nodes, each capacitor being coupled in series with a resistive element, the apparatus further comprising a comparator having a first input coupled to a first node intermediate the capacitor and the respective resistive element in series therewith and having a second input coupled to a first node intermediate the reference capacitor and the respective resistive element in series therewith, the comparator having an output for providing a differential output signal.

10. A micro-electromechanical system (MEMS) motion sensor for sensing motion of a device to which the sensor is attached, the motion sensor comprising:
a fixed support member;
a deflection member attached to the support member so as to deflect relative to the support member from motion of the device to which the sensor is attached;
a first capacitor plate connected to the fixed support member; and
a second capacitor plate connected to the deflection member, the second capacitor plate being parallel to and spaced from the first capacitor plate, the first capacitor plate and the second capacitor plate forming a capacitor, the first and second capacitor plates having different work functions and being electrically connected with each other to provide a current through the capacitor, the current through the capacitor being based on the deflection of the deflection member, the motion sensor further comprising a reference capacitor having third and fourth capacitor plates spaced from one another, the third and fourth capacitor plates having different work functions, wherein the third and fourth capacitor plates are fixed with respect to one another such that a spacing between the plates is maintained for providing a reference current through the reference capacitor.

11. The MEMS motion sensor of claim 10, wherein the fixed support member and the deflection member are attached through an elastic member.

12. The MEMS motion sensor of claim 10, wherein the MEMS comprises three capacitors oriented to detect motion along a vertical axis, a lateral axis and a longitudinal axis, each capacitor having two spaced capacitor plates of different work functions.

13. The MEMS motion sensor of claim 10, wherein the fixed support member comprises a plurality of the first capacitor plates and the deflection member has a plurality of the second capacitor plates, wherein the plurality of first and second capacitor plates are arranged in an interdigitated relationship to form a plurality of capacitors.

14. The MEMS motion sensor of claim 13, wherein the plurality of first capacitor plates have a material having a first work function on both a first side and a second side thereof, and the plurality of second capacitor plates have a material having the first work function on a first side thereof and a material having a second work function different than the first work function on a second side thereof.

15. The MEMS motion sensor of claim 10, further comprising a comparator having a first input coupled to the capacitor and a second input coupled to the reference capacitor and an output for providing a differential output signal.

16. A method for detecting motion through a micro-electromechanical sensor (MEMS) comprising the steps of:
providing a capacitor having first and second capacitor plates spaced from one another, the first and second capacitor plates having different work functions and being electrically connected with each other, wherein the plates are movable with respect to one another such that a spacing between the plates changes in response to a force; and
monitoring current through the capacitor, the current being representative of a rate of change in the spacing between the plates at a given time.

17. The method of claim 16, further comprising the step of providing a second capacitor having third and fourth capacitor plates spaced from one another, the third and fourth capacitor plates having different work functions, wherein the third and fourth capacitor plates are fixed with respect to one another such that a spacing between the plates is maintained for providing a reference current through the second capacitor,
wherein the monitoring step comprises generating a first voltage with the current through the capacitor, generating a second voltage with the reference current, and comparing the first and second voltages.

18. The method of claim 16,
wherein the providing step comprises providing a plurality of the first capacitor plates and a plurality of the second capacitor plates, the plurality of first and second capacitor plates being arranged in an interdigitated relationship to form a plurality of capacitors, the plurality of first capacitor plates having a material having a first work function on both a first side and a second side thereof, and the plurality of second capacitor plates have a material having the first work function on a first side thereof and a material having a second work function different than the first work function on a second side thereof,
wherein the monitoring step comprises monitoring a sum of the current through the plurality of capacitors.

19. A micro-electromechanical apparatus for detecting mechanical displacement comprising:
a capacitor having first and second capacitor plates spaced from one another, the first and second plates having different work functions and being electrically connected with each other, wherein the plates are movable with respect to one another such that a spacing between the plates changes in response to a force, a current through the capacitor being representative of a rate of change in the spacing between the plates at a given time; and
a second capacitor having third and fourth capacitor plates spaced from one another, the third and fourth capacitor plates having different work functions, wherein the third and fourth capacitor plates are fixed with respect to one another such that a spacing between the plates is maintained in response to the force to provide a reference current through the second capacitor.

20. The apparatus of claim 19, wherein the capacitors are connected in parallel with one another between two power supply nodes, each capacitor being coupled in series with a resistive element, the apparatus further comprising a comparator having a first input coupled to a first node intermediate the capacitor and the respective resistive element in series therewith and having a second input coupled to a first node intermediate the second capacitor and the respective resistive element in series therewith, the comparator having an output for providing a differential output signal.

21. A micro-electromechanical system (MEMS) comprising:
a fixed support member;
a deflection member attached to the support member so as to deflect relative to the support member;
a first capacitor plate connected to the fixed support member;
a second capacitor plate connected to the deflection member, the second capacitor plate being parallel to and spaced from the first capacitor plate, the first capacitor plate and the second capacitor plate forming a capacitor, the first and second capacitor plates having different work functions and being electrically connected with each other to provide a current through the capacitor, the current through the capacitor being based on the deflection of the deflection member; and
a second capacitor having third and fourth capacitor plates spaced from one another, the third and fourth capacitor plates having different work functions, wherein the third and fourth capacitor plates are fixed with respect to one another such that a spacing between the plates is maintained for providing a reference current through the second capacitor.

22. The MEMS of claim 21, further comprising a comparator having a first input coupled to the capacitor and a second input coupled to the second capacitor and an output for providing a differential output signal.

* * * * *